US012761999B2

(12) United States Patent
Sridharan et al.

(10) Patent No.: US 12,761,999 B2
(45) Date of Patent: Oct. 13, 2026

(54) OUT-OF-BAND ERROR REPORTING IN A DATA CENTER

(71) Applicants: ADVANCED MICRO DEVICES, INC., Santa Clara, CA (US); ATI TECHNOLOGIES ULC, Markham (CA)

(72) Inventors: Vilas Sridharan, Boston, MA (US); Kabita Rani Saha, Austin, TX (US); Carlos Vallin, Austin, TX (US); Maher Mounir Moghabghab, Markham (CA); Vignesh Vaidhyanathan Seshan, Markham (CA); Fabio Giorgio Gulino, Markham (CA); Alexander Kaganov, Toronto (CA)

(73) Assignees: Advanced Micro Devices, Inc., Santa Clara, CA (US); ATI TECHNOLOGIES ULC, Markham (CA)

( * ) Notice: Subject to any disclaimer, the term of this patent is extended or adjusted under 35 U.S.C. 154(b) by 0 days.

(21) Appl. No.: 18/999,504

(22) Filed: Dec. 23, 2024

(65) Prior Publication Data

US 2026/0104956 A1 Apr. 16, 2026

Related U.S. Application Data

(60) Provisional application No. 63/707,539, filed on Oct. 15, 2024.

(51) Int. Cl.
*G06F 11/07* (2006.01)

(52) U.S. Cl.
CPC ...... *G06F 11/0772* (2013.01); *G06F 11/0766* (2013.01); *G06F 11/0784* (2013.01)

(58) Field of Classification Search
CPC ............. G06F 11/0772; G06F 11/0784; G06F 11/0766; G06N 20/00
See application file for complete search history.

(56) References Cited

U.S. PATENT DOCUMENTS 6,601,186 B1 * 7/2003 Fox ..................... G06F 11/0715 719/321
6,785,843 B1 * 8/2004 McRae ................... H04L 45/00 714/4.2
8,730,790 B2 * 5/2014 Khawer ................ H04W 24/04 370/216
10,387,672 B1 * 8/2019 Harland .................. G06F 21/85
(Continued)

*Primary Examiner* — Jonathan D Gibson

(57) ABSTRACT

An apparatus includes a storage location that is accessible to control plane circuitry and first circuitry configured to receive an interrupt indicating a fatal error. The first circuitry is also configured to provide, in response to the interrupt, first information indicating the fatal error to a data plane entity and second information indicating the fatal error to the storage location. The second information in the storage location is accessible via a control plane connection independently of the data plane entity initiating one or more recovery actions in response to receiving the first information. A system management controller (SMC) or a baseboard management controller (BMC) can be configured to access the second information in the storage location and convey the second information to control plane circuitry in a data center.

20 Claims, 4 Drawing Sheets

(56) References Cited

U.S. PATENT DOCUMENTS

| | | | | |
|---|---|---|---|---|
| 11,449,383 | B2 * | 9/2022 | Tan | G06F 11/0751 |
| 12,381,846 | B2 * | 8/2025 | Narayanan | G06F 11/22 |
| 2004/0255202 | A1 * | 12/2004 | Wong | G06F 11/0793 714/E11.023 |
| 2008/0056121 | A1 * | 3/2008 | Tsai | H04L 45/28 370/216 |
| 2009/0310482 | A1 * | 12/2009 | Asaie | G06F 11/1443 370/225 |
| 2010/0080119 | A1 * | 4/2010 | Ansorge | H04L 41/0677 370/225 |
| 2013/0198575 | A1 * | 8/2013 | Etaati | G06F 11/3055 714/48 |
| 2015/0149812 | A1 * | 5/2015 | Arisoylu | G06F 11/0793 714/4.1 |
| 2017/0315854 | A1 * | 11/2017 | Movsisyan | G06F 11/0709 |
| 2021/0109832 | A1 * | 4/2021 | Ladkani | G06F 11/3013 |
| 2025/0225017 | A1 * | 7/2025 | Sridharan | G06F 11/3476 |
| 2026/0104956 | A1 * | 4/2026 | Sridharan | G06F 11/0772 |

* cited by examiner

OUT-OF-BAND ERROR REPORTING IN A DATA CENTER

BACKGROUND

Data centers provide dedicated space to house collections of servers that are interconnected to support applications including Internet searches, data storage, cloud computing, cryptocurrencies, artificial intelligence (AI), and machine learning (ML). A typical server in a data center includes, among other things, a central processing unit (CPU), memory, and one or more buses such as a peripheral component interface express (PCIe) bus that operates according to the PCIe standard high-speed serial expansion bus. The PCIe bus in a server provides a common interface for one or more expansion cards such as a graphics processing unit (GPU) or a hardware accelerator. For example, the servers in a data center that supports AI or ML applications can include hardware accelerators for machine learning, deep learning, high-performance computing, and the like. In some cases, the expansion cards conform to the Open Compute Project (OCP) Accelerator Module (OAM) design specifications.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
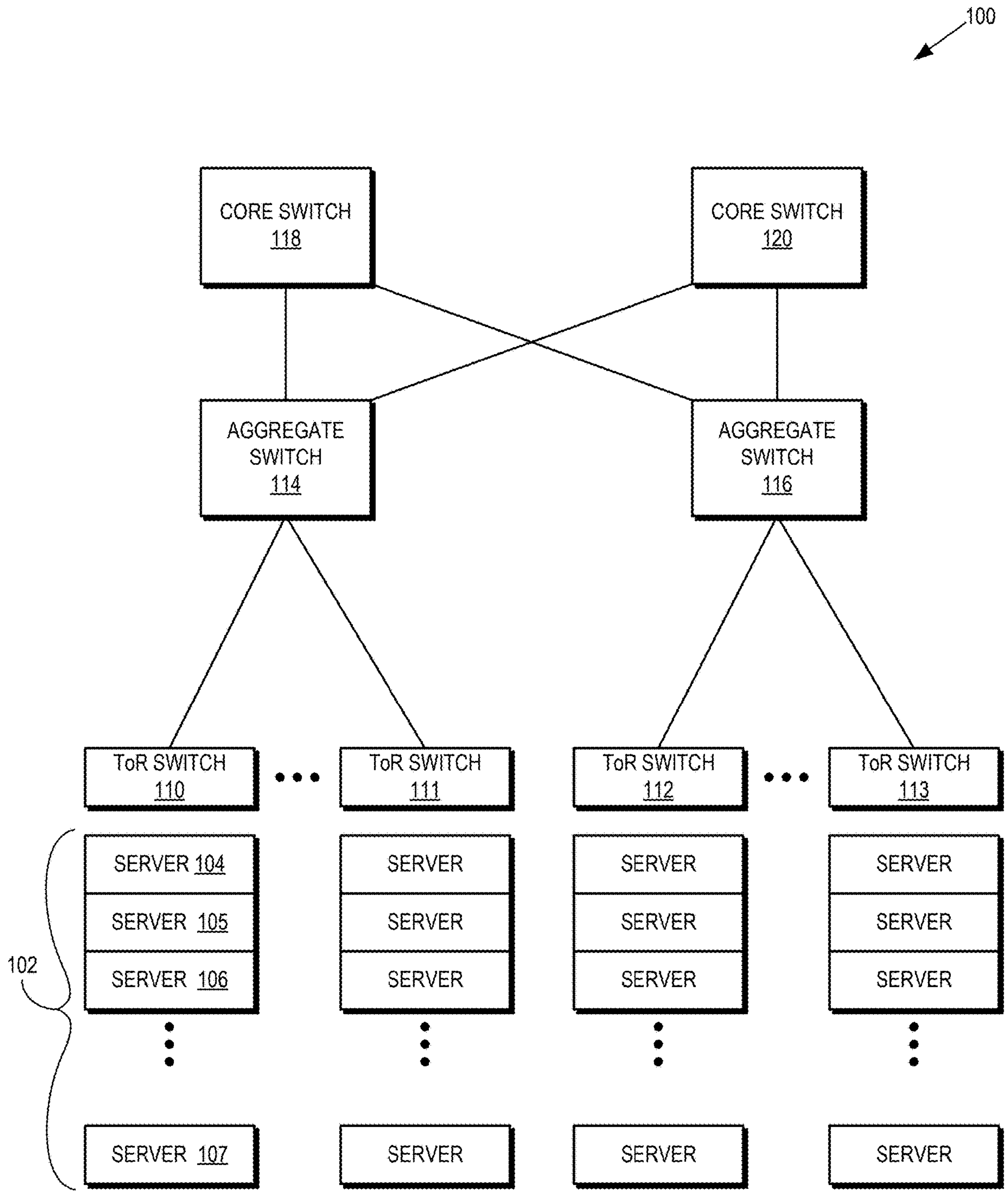
FIG. 1 illustrates a data center that supports out-of-band error reporting in the control plane of the data center, according to some embodiments.

In operation, a CPU or other general processor operating in a data center server sends work (e.g., instructions, commands, or operations) to a GPU or hardware accelerator via the PCIe bus and results are returned to the CPU via the PCIe bus. A controller such as a baseboard management controller (BMC) performs platform management operations such as adjusting fan speeds or voltages to control an operating temperature of the server. The server typically supports two connections from the server to the data center: one on the data plane and one on the control plane. The data plane connection can be used to receive information from the data center and provide results to the data center. For example, the server can receive a search request from the data center via an ethernet connection in the data plane and return results of the search request to the data center via the data plane ethernet connection. The control plane connection can be used to convey control signaling and error reports within the data center. However, errors that occur in expansion cards are not reported to the control plane of the data center. Instead, devices that detect errors inform the corresponding device driver (in band), and the device driver is responsible for informing a system console, kernel log, or other entity. As used herein, the term “in band” refers to communication that occurs in the data plane and the term “out-of-band” refers to communication that occurs in the control plane.

FIGS. 1-4 illustrate systems, apparatuses, and methods of providing out-of-band error reporting from an accelerator circuit using a controller (or microcontroller) that is implemented by the accelerator circuit. For example, circuitry and firmware in the accelerator circuit can implement an out-of-band agent such as a baseboard management controller (BMC) to provide a control plane connection to a control plane in a data center. In response to receiving an interrupt indicating a fatal error, the controller stores duplicate copies of the information indicating the fatal error: a first copy that is provided to a data plane entity such as a driver of the accelerator circuit and a second copy that is stored for the out-of-band agent. The out-of-band agent stores the second copy of the information indicating the fatal error in a location that survives the recovery actions (e.g., a device reset) and is accessible by the out-of-band agent (e.g., via an inter-integrated circuit, or I2C, link). The driver (or other data plane entity) initiates one or more recovery actions in response to receiving the first copy of the information indicating the fatal error. The recovery actions are performed in the data plane circuitry of the accelerator circuit. The out-of-band agent uses the second copy to report the fatal error to the control plane in the data center. The control plane report is provided independently of the recovery actions performed by the driver (or other data plane entity) in the data plane. The out-of-band agent can therefore report the fatal error to the control plane in the data center concurrently with, or subsequent to, the recovery actions performed by the driver (or other data plane entity).

FIG. 1 illustrates a data center 100 that supports out-of-band error reporting in the control plane, according to some embodiments. The data center 100 shown in FIG. 1 implements a “top of rack” (ToR) topology. However, other embodiments of the data center 100 can implement other topologies including a centralized topology, a zoned topology, and the like. The data center 100 can be configured according to a mesh network using a network fabric, a multi-tier architecture, a mesh point of delivery architecture, a super spline mesh, and the like. The entities in the data center can be interconnected as a local area network (LAN) or storage area network (SAN) using fiber-optic network cabling, copper cabling, and the like.

The data center 100 includes server cabinets 102 that hold one or more individual servers 104, 105, 106, 107, which are collectively referred to herein as “the servers 104-107.” In the interest of clarity, only the servers 104-107 in the server cabinet 102 are indicated by reference numerals. The server cabinets 102 are connected to ToR switches 110, 111, 112, 113, which are collectively referred to herein as “the ToR switches 110-113.” The ToR switches 110-113 provide interconnections between the servers 104-107, as well as uplinks to the next layer of switching. In the illustrated embodiment, the next layer of switching includes aggregate switches 114, 116, which are interconnected with core switches 118, 120. Although a single additional switching layer including two aggregate switches 114, 116 that interconnect with a layer of two core switches 118, 120 is shown in FIG. 1, some embodiments of the data center 100 can include additional switches or additional switching layers. Although not shown in FIG. 1 in the interest of clarity, some embodiments of the data center 100 include one or more storage cabinets for storing data that is consumed or produced by applications executing on the servers 104-107 in the data center 100.

The data center 100 includes circuitry that is configured to support a data plane and circuitry that is configured to support a control plane. There are likely to be frequent errors in the data plane during operation of the data center due, at least in part, to the large number of servers 104-107 that are concurrently executing a large and diverse population of applications. Fatal errors should be reported to the control plane of the data center 100. The data center 100 therefore supports out-of-band reporting of fatal errors that occur in the servers 104-107. Some embodiments of the servers 104-107 include first circuitry (such as a BMC) configured to provide a control plane connection to an external entity in the data center 100 such as the ToR switches 110-113. The servers 104-107 also include second circuitry configured to receive interrupts in response to the fatal error. The circuitry in the servers 104-107 can provide, in response to the interrupts, information such as error logs to a driver that is responsible for initiating recovery actions. The second circuitry also provides a copy of the error log to a location accessible to the first circuitry. The information stored in this location survives the recovery actions initiated by the driver or persists after the recovery actions so that this information is available for out-of-band reporting. As used herein, the terms "survive" and/or "persist" indicate that stored information is not erased, overwritten, or otherwise made unavailable or inaccessible by an operation such as a device reset. The first circuitry can therefore convey the copy of the error log to the control plane of the data center 100 independently of the driver initiating and/or performing the recovery action(s).

Figure 2:
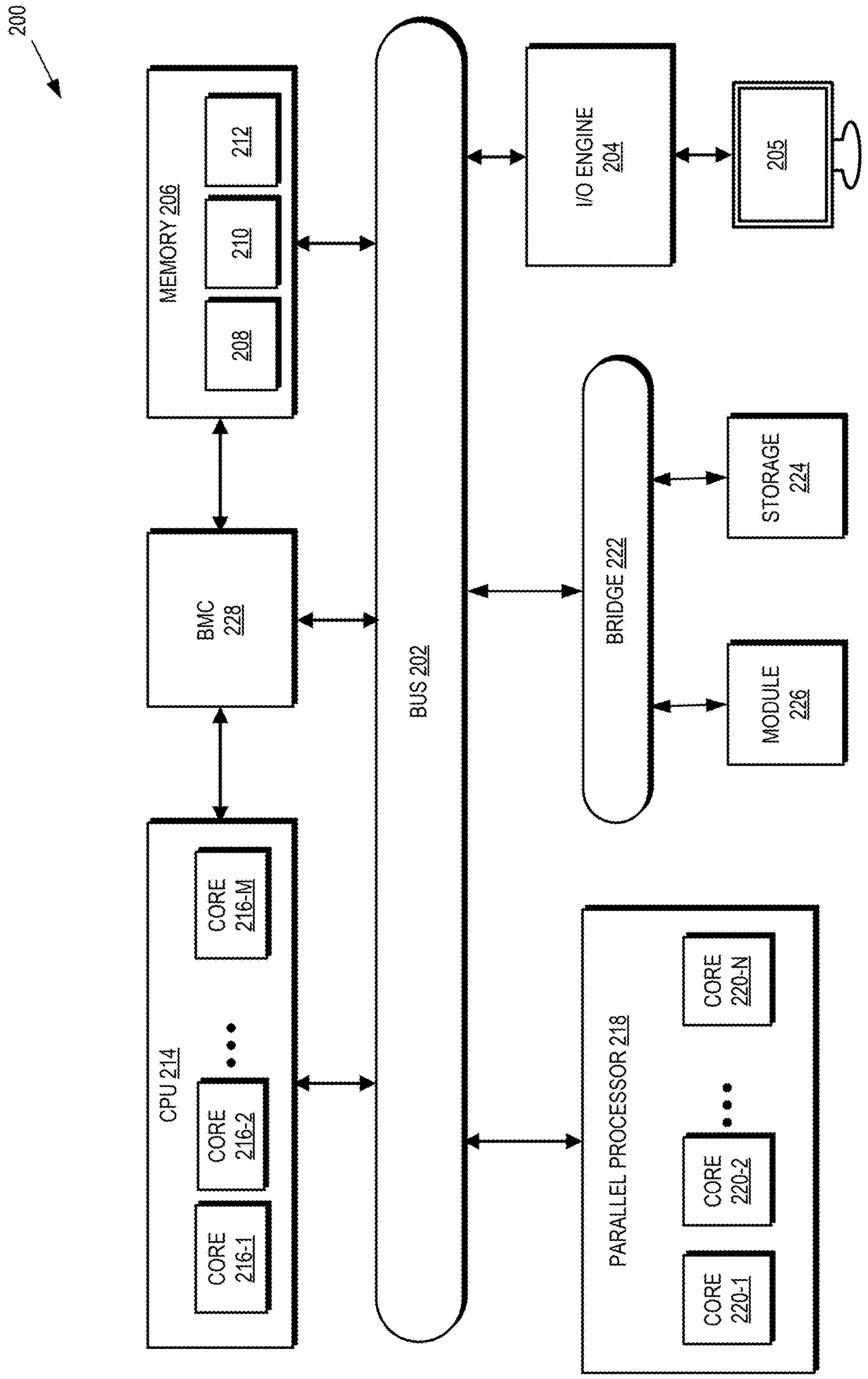
FIG. 2 illustrates a processing system configured to operate as a server in a data center, according to some embodiments.

FIG. 2 illustrates a processing system 200 configured to operate as a server in a data center, according to some embodiments. Some embodiments of the processing system 200 represent one or more of the servers 104-107 in the data center 100 shown in FIG. 1. The processing system 200 includes a bus 202 implemented with circuitry that supports communication between entities implemented in the processing system 200. Some implementations of the processing system 200 include other buses, bridges, switches, routers, and the like, which are not shown in FIG. 2 in the interest of clarity. An input/output (I/O) engine 204 is implemented with circuitry that handles input or output operations associated with a display 205, as well as other elements of the processing system 200 such as keyboards, mice, printers, external disks, and the like. The I/O engine 204 is coupled to the bus 202 so that the I/O engine 204 can communicate with other entities in the processing system 200 by exchanging signals over the bus 202.

Processing system 200 also includes or has access to a memory 206 or other storage component implemented using a non-transitory computer-readable medium, for example, a dynamic random-access memory (DRAM). However, some embodiments of the memory 206 are implemented using other types of memory including, for example, static random-access memory (SRAM), nonvolatile RAM, and the like. Some embodiments of the memory 206 include an external memory implemented outside of, or external to, the processing units implemented in the processing system 200. The memory 206 can store information representing instructions such as program code 208 for one or more applications (e.g., graphics applications, compute applications, machine-learning applications), data 210 that is consumed by the program code 208, and results 212 produced by executing the program code 208.

The processing system 200 includes a central processing unit (CPU) 214 that is connected to the bus 202 to communicate with other entities in the processing system 200, such as the I/O engine 204, the memory 206, or other entities connected to the bus 202. The CPU 214 implements circuitry including a plurality of processor cores 216-1, 216-2, . . . 216-N that execute instructions concurrently or in parallel. Although three processor cores 216 are shown in FIG. 2, more or fewer processor cores 216 can be implemented in other embodiments of the CPU 214. The processor cores 216 include circuitry to implement one or more compute units such as single-instruction, multiple data (SIMD) units that perform the same operation on different data sets to produce one or more results. The CPU 214 is configured to execute instructions such as the program code 208 for one or more applications (e.g., graphics applications, compute applications, machine-learning applications), which is stored in the memory 206. The CPU 214 can consume data 210 and store information in the memory 206 such as the results 212 of the executed instructions.

Some embodiments of the processing system 200 include a parallel processor 218. The parallel processor 218 can include, for example, a GPU, a general-purpose GPU (GPGPU), a neural processing unit (NPU), an intelligence processing unit (IPU) or other vector processor or type of parallel processor. The parallel processor 218 includes circuitry to implement one or more processor cores 220-1 . . . M that each operate as a compute unit configured to perform one or more operations based on one or more instructions received by the parallel processor 218. Although three processor cores 220 are shown in FIG. 2, more or fewer processor cores 220 can be implemented in other embodiments of the parallel processor 218. The compute units in the processor cores 220 are implemented as circuitry for one or more single-instruction, multiple data (SIMD) units that perform the same operation on different data sets to produce one or more results. The parallel processor 218 is connected to the bus 202 to support communication with other entities in the processing system 200.

Some embodiments of the processing system 200 include a bridge 222 that is connected to the bus 202 to communicate with other entities in the processing system 200, such as the CPU 214 or the parallel processor 218. Some embodiments of the bridge 222 include circuitry to implement a peripheral component interconnect (PCI) bridge or a PCI express (PCI-e) bridge that supports connections to other entities such as storage devices or expansion cards. In the illustrated embodiment, a storage device 224 and one or more modules 226 communicate with other entities in the processing system 200 via the bridge 222. The one or more modules 226 can be implemented on an expansion card that includes circuitry to implement an external GPU or a hardware accelerator. Examples of hardware accelerators include hardware accelerators for machine learning, deep learning, high-performance computing, and the like. In some cases, expansion cards connected to the bridge 222 conform to the Open Compute Project (OCP) Accelerator Module (OAM) design specifications.

The processing system 200 also includes an out-of-band agent 228 that includes circuitry to support control plane signaling within the processing system 200 and with devices external to the processing system 200. In the illustrated embodiment, the out-of-band agent 228 is implemented as a baseboard management controller (BMC) 228. In operation, a microcontroller in the module 226 is configured to receive interrupts when fatal errors occur in the data plane of the module 226. In response to an interrupt, the module 226 provides an error log to a driver (or other data plane entity) that can initiate recovery actions in the module 226. The module 226 also provides a copy of the error log to a location (such as the memory 206) that survives the recovery actions and remains available during and after the recovery actions. The BMC 228 can therefore access the copy of the error log and notify control plane entities in a data center that houses the processing system 200. The BMC 228 can provide information in the error log to the control plane of the data center independently of the recovery actions performed by the driver (or other data plane entity) so that the out-of-band error reporting can be performed concurrently with or subsequently to the recovery actions.

Figure 3:
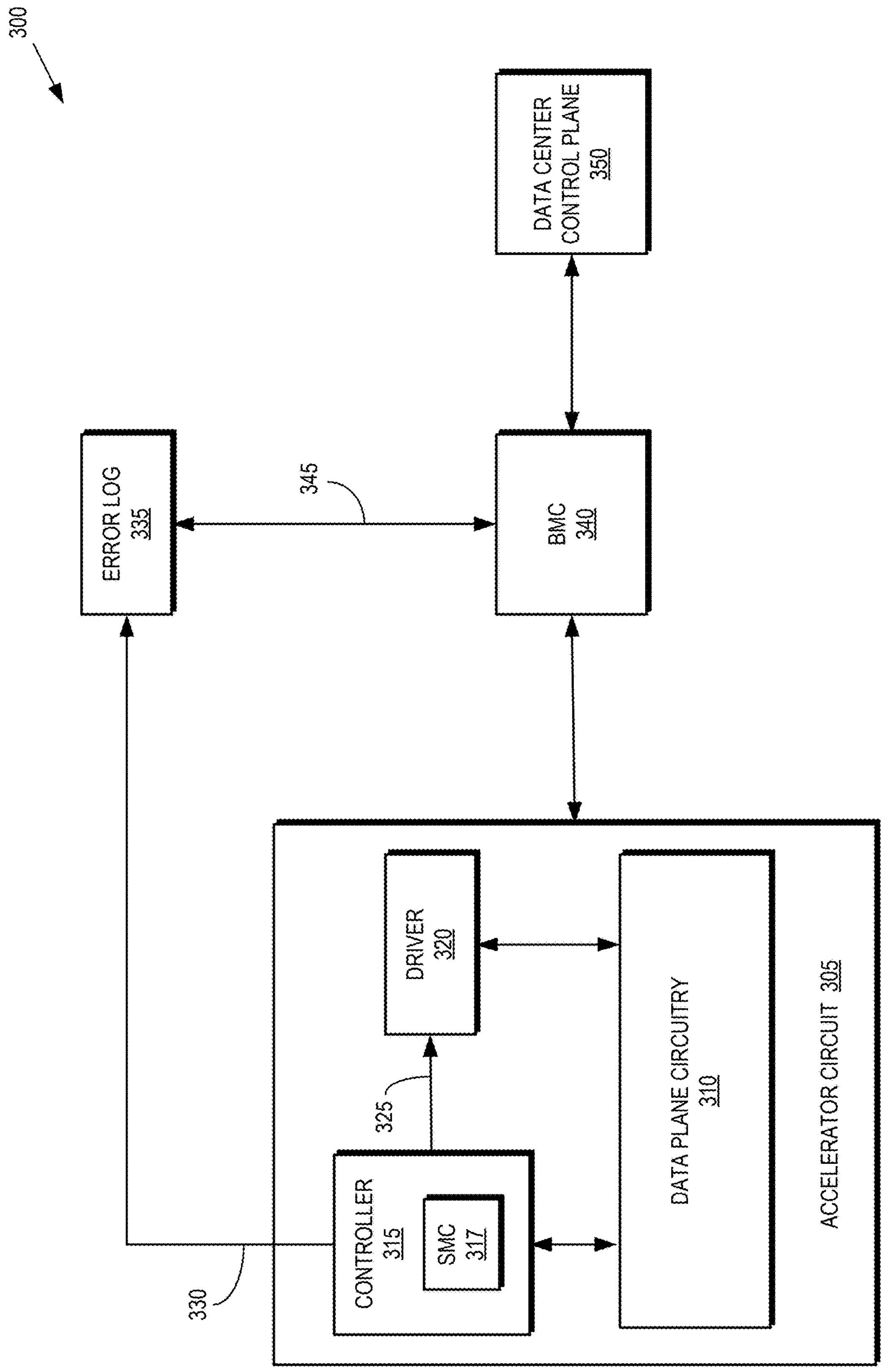
FIG. 3 illustrates a portion of a processing system that includes an accelerator circuit, according to some embodiments.

FIG. 3 illustrates a portion 300 of a processing system that includes an accelerator circuit 305, according to some embodiments. The portion 300 represents a portion of some embodiments of the data center 100 shown in FIG. 1 and the processing system 200 shown in FIG. 2. The accelerator circuit 305 includes circuitry configured to implement devices including an external GPU or a hardware accelerator, such as a machine learning accelerator, a deep learning accelerator, or a high-performance computing accelerator. In the illustrated embodiment, functionality of the device is implemented in the data plane circuitry 310 of the accelerator circuit 305.

Errors that occur in the data plane circuitry 310, such as a fatal error of an application executing on the data plane circuitry 310, generate interrupts that are visible to other entities in the accelerator circuit 305. In the illustrated embodiment, a controller 315 includes circuitry that is configured to monitor the accelerator circuit to detect interrupts that are generated in response to fatal errors. For example, the controller 315 can be an onboard microcontroller including a system management controller (SMC) 317 that is implemented as circuitry configured with firmware to manage hardware error logs such as accelerator check architecture (ACA) logs. In response to receiving an interrupt indicating a fatal error, the controller 315 provides an error log (or other information indicating or representing the fatal error) to a driver 320 in the accelerator circuit 305, as indicated by the arrow 325. The driver 320 initiates and performs one or more recovery actions in response to receiving the error log. In some embodiments, the driver 320 initiates and performs a device reset of the data plane circuitry 310 in the accelerator circuit 305. For example, if the data plane circuitry 310 is configured to implement a GPU, the driver 320 for the GPU can recover from a fatal error by terminating any apps that are currently using the GPU and then resetting the GPU. Although the driver 320 initiates and performs recovery actions in the embodiment shown in FIG. 3, the error log can be provided to other data plane entities or agents such as an operating system in some embodiments and the other data plane entities or agents can initiate and perform the recovery actions.

The controller 315 also provides (as indicated by the arrow 330) a copy of the error log (or other information indicating or representing the fatal error) to a location 335 that is accessible to control plane circuitry such as a BMC 340. In some embodiments, the SMC 317 provides the copy of the error log to the location 335 and then notifies the BMC 340. The storage location 335 can be implemented in a memory such as the memory 206 shown in FIG. 2, in one or more registers that are internal or external to the controller 315, or other storage elements that are internal or external to the accelerator circuit 305. Some embodiments of the BMC 340 correspond to the BMC 228 in the processing system 200 shown in FIG. 2. Information such as the error log stored at the location 335 can be used for out-of-band error reporting because information in the location 335 survives recovery actions such as a device reset performed by the driver 320. Information stored at the location 335 is also directly accessible by control plane functionality including the BMC 340. In some embodiments, the BMC 340 accesses the error log stored at the location 335 via a link 345 such as an inter-integrated circuit (I2C) link.

The BMC 340 is configured to report errors to a data center control plane 350. Some embodiments of the BMC 340 are notified via a message or interrupt when a new error log is created or added to the location 335. The BMC 340 can then access the newly created or added error log from the location 335 and provide this information (or other information derived from the error log) to the data center control plane 350. Some embodiments of the BMC 340 poll the error logs at the location 335 to determine whether new error logs have been created or added to the location 335. Polling can be performed periodically, at predetermined time intervals, in response to predetermined events, or at other times. If the BMC 340 detects a newly created or added error log at the location 335, the BMC 340 can provide this information to the data center control plane 350.

Figure 4:
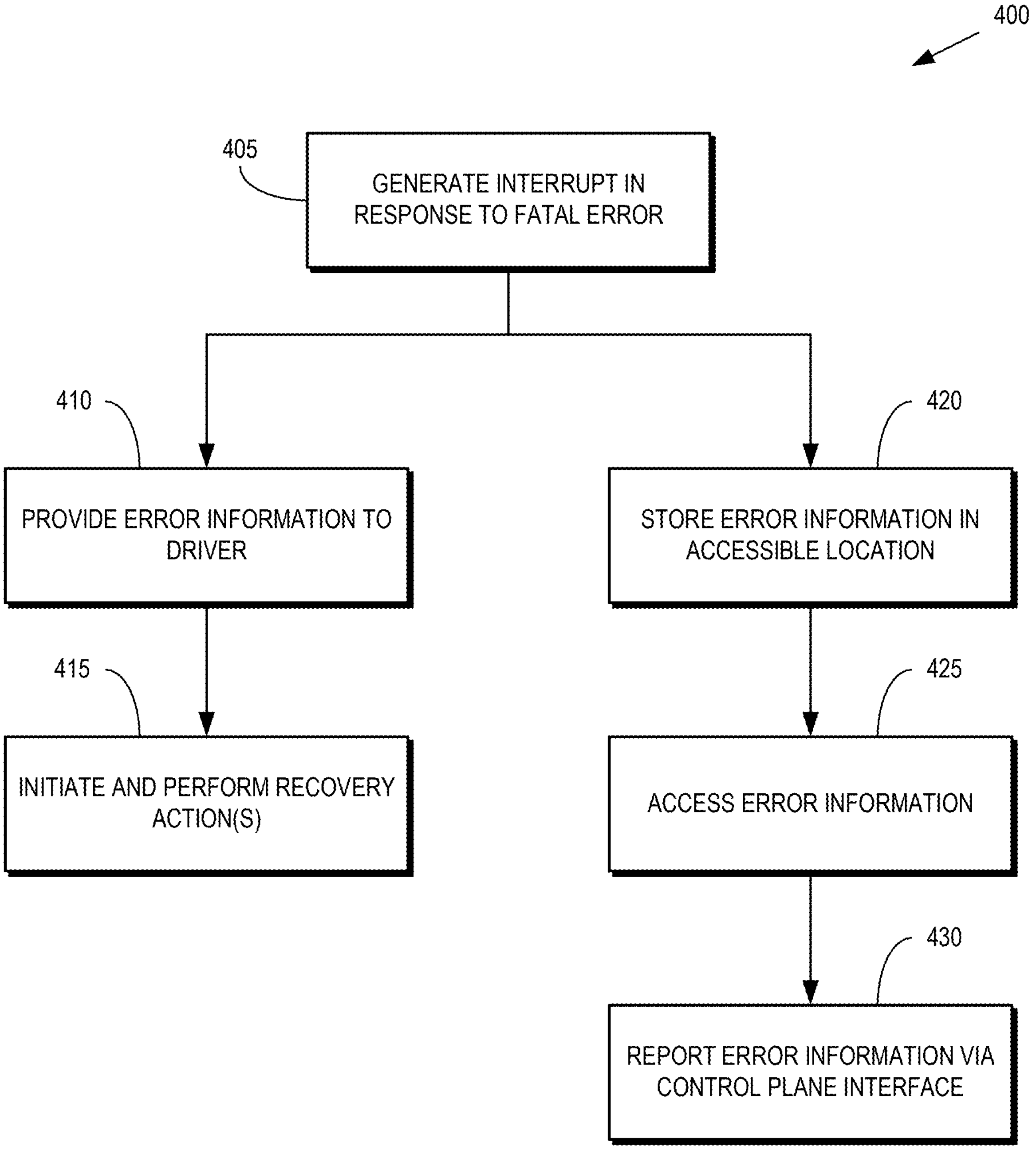
FIG. 4 illustrates a method of out-of-band error reporting in a data center, according to some embodiments.

FIG. 4 illustrates a method 400 of out-of-band error reporting in a data center, according to some embodiments. The method 400 is implemented in some embodiments of the data center 100 shown in FIG. 1, the processing system 200 shown in FIG. 2, and the portion 300 of the processing system shown in FIG. 3.

At block 405, an interrupt is generated in response to a fatal error occurring in a processing system. In the illustrated embodiment, the fatal error occurs in an accelerator circuit such as a GPU or a hardware accelerator that is implemented in a server of a data center. The interrupt is detected by a controller such as an onboard microcontroller implemented in firmware. The method 400 then flows along two branches that correspond to actions taken by the controller in response to detecting the interrupt. The first branch includes the blocks 410, 415 and the second branch includes the blocks 420, 425, 430.

At block 410, the controller provides error information, such as an error log, to a data plane entity such as a driver in the accelerator circuit or an operating system. The method 400 then flows to the block 415.

At block 415, the driver initiates and performs one or more recovery actions. In some embodiments, the recovery actions include a device reset of the accelerator circuit. The recovery actions can also include terminating one or more applications that are executing on the accelerator circuit prior to performing the device reset.

At block 420, the controller stores the error information in a location that is accessible to a control plane entity such as the BMC 228 shown in FIG. 2 or the BMC 340 shown in FIG. 3. Information stored in the accessible location can survive the recovery actions performed by the driver so that the control plane entity can access the stored information before, concurrently with, or after the driver performs the recovery actions.

At block 425, the control plane entity accesses the error information that is stored in the accessible location and then the control plane entity reports (at block 430) this information via a control plane interface to the control plane of the data center.

The blocks 410, 415 of the first branch and the blocks 420, 425, 430 of the second branch of the method 400 are depicted as occurring concurrently. However, the operations in the blocks 420, 425, 430 of the second branch are performed independently of the operations in the blocks 410, 415 of the first branch because the control plane entity can access the stored error information from the accessible location before, concurrently with, or after the recovery actions. Thus, the first branch and the second branch of the method 400 can be performed independently of each other. The second branch of the method 400 can therefore be performed concurrently with or after the first branch of the method 400.

In some embodiments, certain aspects of the techniques described above are implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. An apparatus comprising:

a storage location that is accessible to control plane circuitry; and first circuitry configured to receive an interrupt indicating a fatal error and provide, in response to the interrupt, first information indicating the fatal error to a data plane entity and second information indicating the fatal error to the storage location, wherein the second information in the storage location is accessible via a control plane connection independently of the data plane entity initiating at least one recovery action in response to receiving the first information.

2. The apparatus of claim 1, further comprising:

at least one of a system management controller (SMC) or a baseboard management controller (BMC) configured to access the second information in the storage location and convey the second information to control plane circuitry in a data center.

3. The apparatus of claim 1, further comprising:

second circuitry configured to implement the data plane entity; and third circuitry configured to implement an accelerator circuit, wherein the data plane entity is configured to support the accelerator circuit, and wherein the third circuitry comprises the first circuitry.

4. The apparatus of claim 3, wherein the data plane entity comprises a driver that is configured to initiate the at least one recovery action in data plane circuitry of the accelerator circuit.

5. The apparatus of claim 4, wherein the driver is configured to initiate a device reset of the accelerator circuit in response to receiving the first information indicating the fatal error.

6. The apparatus of claim 5, wherein the first circuitry is configured to provide the second information to a location that survives the device reset of the accelerator circuit.

7. The apparatus of claim 6, wherein the first circuitry is configured to convey the second information to an external entity via the control plane connection concurrently with the driver performing the device reset of the accelerator circuit.

8. The apparatus of claim 6, wherein the first circuitry is configured to convey the second information to an external entity via the control plane connection subsequent to the driver performing the device reset of the accelerator circuit.

9. A method comprising:

receiving an interrupt indicating a fatal error;

providing, in response to the interrupt, first information indicating the fatal error to a driver and second information indicating the fatal error to a location accessible to first circuitry that provides a control plane connection to an external entity; and conveying the second information from the first circuitry to the external entity via the control plane connection independently of the driver initiating at least one recovery action in response to receiving the first information.

10. The method of claim 9, further comprising:

initiating, at the driver, the at least one recovery action in data plane circuitry of an accelerator circuit.

11. The method of claim 10, wherein initiating the at least one recovery action comprises initiating a device reset of the accelerator circuit in response to the driver receiving the first information indicating the fatal error.

12. The method of claim 11, wherein providing the second information to the location comprises providing the second information to a location that survives the device reset of the accelerator circuit.

13. The method of claim 12, wherein conveying the second information from the first circuitry to the external entity comprises conveying the second information to the external entity via the control plane connection concurrently with performing the device reset of the accelerator circuit.

14. The method of claim 13, wherein conveying the second information from the first circuitry to the external entity comprises conveying the second information to the external entity via the control plane connection subsequent to performing the device reset of the accelerator circuit.

15. An accelerator circuit comprising:

first circuitry configured to implement a first controller; and second circuitry configured to implement a second controller that provides a control plane connection between the accelerator circuit and an external entity, wherein the first controller provides, in response to a fatal error in data plane circuitry of the accelerator circuit, first information indicating the fatal error to a driver and second information indicating the fatal error to a location accessible to the second controller, wherein the second controller conveys the second information to the external entity via the control plane connection independently of the driver initiating at least one recovery action in response to receiving the first information.

16. The accelerator circuit of claim 15, wherein the driver is configured to initiate a device reset of the accelerator circuit in response to receiving the first information indicating the fatal error.

17. The accelerator circuit of claim 16, wherein the first controller is configured to provide the second information to a location that survives the device reset of the accelerator circuit.

18. The accelerator circuit of claim 17, wherein the second controller conveys the second information to the external entity via the control plane connection concurrently with the driver performing the device reset of the accelerator circuit.

19. The accelerator circuit of claim 17, wherein the second controller conveys the second information to an external entity via the control plane connection subsequent to the driver performing the device reset of the accelerator circuit.

20. The accelerator circuit of claim 15, further comprising:

third circuitry configured to implement at least one of a graphics processing unit (GPU) a hardware accelerator for machine learning, a hardware accelerator for deep learning, or a hardware accelerator for high-performance computing.

* * * * *